(12) United States Patent
Metz et al.

(10) Patent No.: US 7,211,329 B2
(45) Date of Patent: May 1, 2007

(54) PROCESS FOR MAKING A PRODUCT WITH A LONG-LASTING EASILY CLEANED SURFACE AND PRODUCT THEREOF

(75) Inventors: Bernd Metz, Meinz (DE); Gerhard Weber, Bechenheim (DE); Mevluda Blecker, Mainz (DE)

(73) Assignee: Schott AG, Mainz (DE)

( * ) Notice: Subject to any disclaimer, the term of this patent is extended or adjusted under 35 U.S.C. 154(b) by 433 days.

(21) Appl. No.: 10/458,407

(22) Filed: Jun. 10, 2003

(65) Prior Publication Data

US 2004/0005469 A1   Jan. 8, 2004

Related U.S. Application Data

(63) Continuation-in-part of application No. 09/866,419, filed on May 25, 2001, now abandoned.

(30) Foreign Application Priority Data

May 18, 2001   (DE) ................. 101 24 422

(51) Int. Cl.
  *B32B 13/04*   (2006.01)
  *B05D 3/02*   (2006.01)
(52) U.S. Cl. ............... 428/446; 428/428; 428/432; 428/448; 428/701; 428/702; 427/372.2; 427/387
(58) Field of Classification Search ............ 428/428, 428/432, 697, 699, 701, 702, 446, 448; 427/331, 427/372.2, 387
See application file for complete search history.

(56) References Cited

U.S. PATENT DOCUMENTS 4,617,057 A   10/1986  Plueddemann 5,368,892 A   11/1994  Berquier
6,245,833 B1 *  6/2001  Kang et al. ............... 523/203
6,372,290 B1   4/2002  Berkenkoetter et al.

FOREIGN PATENT DOCUMENTS

| | | |
|---|---|---|
| DE | 37 01 654 A1 | 7/1987 |
| DE | 43 26 502 A1 | 3/1994 |
| EP | 0 492 545 A2 | 7/1992 |
| EP | 0 658 525 A2 | 6/1995 |
| JP | 5-116989 | 5/1993 |
| WO | 95/24053 | 9/1995 |

* cited by examiner

*Primary Examiner*—John J. Zimmerman
*Assistant Examiner*—G. Blackwell
(74) *Attorney, Agent, or Firm*—Michael J. Striker

(57) ABSTRACT

The easily cleanable coated product is made by a process, in which a coating mixture including a hydrophobic and/or dirt-repellent substance uniformly distributed throughout a hydrolyzable, network-forming gel is applied to a product surface. The hydrophobic and/or dirt-repellent substance, which is a silane of the formula $(CF_xH_y)—(CF_aH_b)_n—(CF_aH_{b'})_m—Si—(OR)_3$, wherein R is an optionally heteroatom-containing, $C_1$–$C_8$-alkyl or aminoalkyl group and x and y each equal 0, 1, 2 or 3 and x+y=3, and a, a' and b, b' each equal 0.1 or 2, and a+b as well as a'+b'=2, and n and m each denote an integer from 0 to 20 and n+m equal at most 30, is chemically bound In the backbone of the gel network to form the easily cleanable coating. The gel is preferably an inorganic metal oxide gel made by a sol-gel process.

17 Claims, No Drawings

PROCESS FOR MAKING A PRODUCT WITH A LONG-LASTING EASILY CLEANED SURFACE AND PRODUCT THEREOF

CROSS-REFERENCE

This is a continuation-in-part of U.S. patent application Ser. No. 09/866,419, filed May 25, 2001, now abandoned.

BACKGROUND OF THE INVENTION

1. Field of the Invention

The invention relates to a process for making a product with an easily cleanable surface by coating the surface with a hydrophobic material and to products obtained by this process.

2. Description of the Related Art

It is generally known to provide objects with soil-repelling substances. For example, it is known to treat the surface of glass, glass-ceramic or glazing, or even of a rock, with a silicone to make them soil-repellent and water-repellent. This is usually accomplished by rendering the surface of the objects to be treated hydrophobic by applying a liquid composition. Many chemicals, particularly silicone oils and/or fluorinated silanes, are commonly used for this purpose. The surfaces treated in this manner are difficult to wet, because the water beads up and runs off. Dirt adheres to the treated surfaces only slightly and can therefore be readily removed. This is particularly advantageous for outdoor use, because, for example in the case of skylights and/or glass roofs, such as those on winter gardens, etc, the deposited dirt is entrained and removed as a result of the rainwater beading up and running off. It is thus possible to keep such surfaces permanently clean without additional cleaning.

The drawback of this method is that the applied chemicals can form permanent bonds only by reacting with OH groups directly available on the substrate material. Sufficiently reactive OH groups are not present on the surface of the treated objects, particularly on glass, without appropriate pretreatment, for example with hydrogen/oxygen plasma. Thus this method gives rise only to a very thin, mostly monomolecular hydrophobic coating which during use, particularly owing to mechanical stress, such as cleaning and/or abrasion by wind and dust, is rubbed off quickly so that the desired self-cleaning property is lost.

Attempts have already been made to improve the durability of such coatings. For example, EP-A-0 658 525 describes the preparation of a water-repellent multilayer film involving the preparation of three different sol solutions which are then mixed and applied to a glass substrate forming a gel coating on the glass surface. Heating then gives rise to a superficial metal oxide layer. To this metal oxide layer is then applied a fluoroalkylsilane coating, as previously described.

JP-A-11 092 175 describes a process in which a methoxysilane or an ethoxysilane compound containing a fluorocarbon chain is attached to the surfaces of small particles with a diameter of 100 nm. The particles modified in this manner are then dissolved in an aqueous medium and applied to the surfaces to be coated. The solvent is then removed and the residue baked. This provides surfaces coated with small hydrophobic particles.

WO 99/64363 describes a method of preparing a water-repellent surface, which comprises first roughening the surface of the glass and removing all metal ions present on the surface. A water-repellent film is then applied in a known manner to the previously treated surface. The roughening of the surface makes it possible for the water repellant to fill the roughness valleys.

WO 99/02463 describes the preparation of a scratch-resistant coating, which involves applying an organic substance with a silicone-like network to a surface. This is followed by a heat treatment in which the temperature and duration are chosen so that the applied purely organic layer is substantially degraded and/or removed. However in the topmost molecular layer the inorganic molecules of the substrate and the organic molecules of the applied substance can form a compound. In this manner, an organic substance, for example a methyl group, is directly attached to the silicon atom of a glass surface by formation of a Si—C bond.

DE 695 02671 T2 (WO95/24053) describes a display device comprising a display screen provided with a light-absorbing coating comprising a hybrid inorganic-organic material consisting of an inorganic network of silicon oxide and metal oxide. The polymeric chains are intertwined with the inorganic network, thereby forming a hybrid inorganic-organic network. It has been shown, however, that organic components, particularly hydrophobic organic components, such as fluoroalkyls, cannot be incorporated homogeneously in such a layer, but that said components primarily adhere to the surface facing away from the carrier layer.

All hydrophobic and possibly soil-repellent properties conferred by the foregoing processes are not sufficiently durable in use and are rapidly lost, particularly as a result of mechanical stress.

SUMMARY OF THE INVENTION

The object of the invention is therefore to provide an easy-care article whose easy-care and soil-repellent finish is long-lasting and which is abrasion-resistant, even under stress, so that the aforesaid easy-care properties of the object or product are retained for a long time.

It is a further object of the invention to provide a finish for optical elements which does not or at least not noticeably alter the optical properties of the element.

According to the invention, this objective is reached through the processes defined in the appended patent claims and through the product thus obtained.

According to the invention, a uniform, resistant coating or a coating on a product with homogeneous or uniform properties in cross-section through the coating is obtained by providing the surface of the product with a layer, which comprises a thin metal oxide network or metal oxide matrix and a hydrophobic substance uniformly distributed therein. This layer is usually a uniform layer of a coherent metal oxide network spread out in a sheet-like manner. The metal oxide networks of the invention can have open or closed pores. The metal oxide layers of the invention are formed by heating a gel layer applied to the surface of the product and remain on the product as a solid coating.

According to the present invention the hydrophobic substance is uniformly distributed in the coating, i.e. the substance is distributed in a uniform concentration in a cross section starting from the layer surface adhering to the carrier material to the outer layer surface and does not accumulate, neither exclusively nor primarily, at the outer coating surface. Thus, the surface layer retains the desired properties as described in the present invention, even in the case of abrasion at the surface. The layer of the present invention does not contain any organic polymer in its basic structure and particularly no cross-linked polymer and/or particle that is embedded in an organic network and/or combined therewith.

The gels used according to the invention are, in particular, metal oxide gels prepared by a sol-gel process. The gels are formed in situ during application to the article or product to be coated, giving rise to a uniform, continuous gel network on the surface of the object to be coated. Preferred metal oxides are $SiO_2$, $Al_2O_3$, $Fe_2O_3$, $In_2O_3$, $SnO_2$, $ZrO_2$, $B_2O_3$ and/or $TiO_2$. Preferred gels are the hydrogels, alkogels, xerogels and/or aerogels. The addition, according to the invention, of the hydrophobic and optionally also oleophobic substance to the sol mixture before or during gel formation ensures that the hydrophobic substance will be uniformly distributed in the entire volume of the forming three-dimensional gel network. It is chemically bound by polycondensation, for example, to silanol groups of the gel network. The metal oxide groups, particularly the silanol groups, to which the individual hydrophobic, oleophobic groups are chemically bonded, are themselves part of the backbone of the gel network. In this manner, it is possible to confer to the surface thus treated pronounced abrasion-resistant and durable soil-repellent properties.

The general preparation of gel coatings by means of a sol-gel process is in itself known and has been frequently described. By this process, in a solution, preferably an aqueous and/or alcoholic solution, a polymer reaction is usually made to occur with inorganic metal salts or organometallic compounds such as metal alkoxides by hydrolysis, giving rise to a colloidal suspension, namely a sol. By further hydrolysis, a coherent gel network is formed from the sol. Preferably, the gel is formed directly during the coating. The final formation of the entire gel network is preferably accelerated by heating. Typical temperatures therefor are between 0° C. and 200° C., preferably between 20° C. and 200° C. and particularly between room temperature and 170° C., a temperature of 150° C. being especially preferred. By appropriate selection of the hydrolysis conditions, it is possible to produce very dense, namely more or less pore-free gel networks or networks having only the tiniest pores. Preferred metal alkoxides are metal $C_1$–$C_4$ alkoxides, among which metal methoxides and metal ethoxides are particularly preferred. Among the metal salts, the metal nitrates are preferred. The hydrolysis with sol formation is usually started with excess distilled water. To complete the sol formation, the mixture is then allowed to stand at ambient temperature or optionally at elevated temperature for an extended period, for example for two to four days.

Those hydrophobic substances that can be incorporated into the forming gel are generally suitable for use as hydrophobic substances in the inventive process. For the process of the invention, it is preferred to use hydrophobic substances capable of distributing themselves very uniformly in the gel-forming sol solution. The hydrophobic substances used in the process of the invention are thus preferably in themselves slightly water-soluble or can be rendered water-soluble with the aid of solubilizers or by hydrolysis. In a further preferred embodiment, the oleophobic substances used according to the present invention may comprise a chemical modification that provides water solubility. Such modifications are water-soluble groups, e.g. amino moieties or acid groups. Examples of such substances are natural and synthetic oils and/or long-chain fatty acids, preferably fatty acids with a chain of at least six carbon atoms and particularly at least ten carbon atoms. Hydrophobic oleophobic substances and, in particular, silicones, silanes, siloxanes, silicone oils and silicone greases, are particularly preferred.

The silicone compounds used according to the invention can be linear or branched or possibly also contain cyclic silane groups. In a preferred embodiment they contain a function that provides water solubility, e.g. an amino group, the hydrogen atoms of which can also be substituted if necessary. A polymerizable group or function that reacts with the hydrophobic and/or oleophobic moieties and/or radicals is not necessary; preferably they do not comprise any such groups, except for the reaction with the metal oxides of the metal oxide chain, of course, particularly with the $SiO_2$ chain. Methyl phenyl silicone is an example of a particularly well-suited silicone according to the invention.

The hydrophobic substances used according to the invention preferably contain fluorine and, in particular, at least 5% and preferably at least 10%, of fluorine atoms (based on the total number of atoms of the hydrophobic substance finally incorporated after sintering). Preferably, however, they contain at least 20% of fluorine atoms, 30% being particularly preferred. Although it has been found that the incorporation of the hydrophobic substances according to the invention by the in situ process results in lasting soil repellency, it is preferred to link the hydrophobic substances chemically with the gel network with the aid of reactive groups and particularly with the aid of reactive silanol groups. Hydrophobic substances with methoxy, ethoxy, propoxy, butoxy or isocyanate groups and chlorosilanes are particularly well suited.

The silanes preferred according to the invention have the general formula

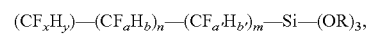

$$(CF_xH_y)-(CF_aH_b)_n-(CF_{a'}H_{b'})_m-Si-(OR)_3,$$

wherein x and y independently of each other stand for 0, 1, 2 or 3 and x+y=3, and a, a' and b, b', independently of each other, stand for 0, 1 or 2, and a+b as well as a'+b'=2, and n and m, independently of each other, denote an integer from 0 to 20 and together add up to a maximum of 30, and R is a straight-chain, branched, saturated or unsaturated (optionally heteroatom-containing) $C_1$–$C_8$-alkyl or aminoalkyl group. Preferred alkyl groups are methyl, ethyl and propyl groups, as well as amino derivatives thereof.

According to the present invention, it is preferred to use silanes that contain heteroatoms and/or functional groups comprising heteroatoms that increase and/or provide the water solubility of the silane. The heteroatoms and/or functional groups are incorporated into the backbone of the alkyl carbon chain and/or of the fluoroalkyl carbon chain and/or adhere thereto as substituents. According to the present invention, amino alkyl groups and/or amino fluoroalkyl groups are particularly preferred.

In a preferred embodiment, x=3 and y=0 so that in the foregoing general formula $CF_3$ is an end group. In another preferred embodiment of the invention, a=2 and a'=0 so that $CF_2$ and $CH_2$ blocks are formed. Naturally, more than two blocks can be present in the chain, and the $CF_2$ and $CH_2$ blocks can be interchanged. It is, of course, preferred to have the fluorinated blocks ending at the Si atom. Preferred values of n are 1–10, preferably 1–8, and for m they are 0–10 and preferably 0–8. In the gel solution to be applied, the weight ratio of the hydrophobic substance to the gel network is preferably from 0.01:1 to 1:1, a ratio between 0.05:1 and 0.2:1 being preferred.

The mixture of gel and hydrophobic substance according to the invention is applied by conventional coating methods, with spraying and dip-coating being preferred. The film thickness can be controlled by adjusting the viscosity of the coating mixture and the rate at which the object to be coated is withdrawn from the dipping solution. According to a particular embodiment, therefore, the coating mixture also contains a viscosity modifier, such as polyvinyl pyrrolidone (PVP), polyvinyl acetate (PVA) and polyethylene oxide (PEO). According to the invention, the preferred film thickness is between 0.5 nm and 1 µm, a film thickness of <200 nm being preferred. After application, the film is dried at room temperature, preferably for at least 1 minute and particularly for at least 3 minutes, dried and then made to harden at an elevated temperature at which optionally added substances such as viscosity modifiers are pyrolyzed or burned. The drying time depends on the film thickness produced, the actual temperature and the vapor pressure of the solvent and is at least 1 minute and particularly at least 3 minutes. The drying time is usually 4–6 minutes. The sintering or hardening of the applied film preferably occurs at a temperature of 150–400° C. and preferably at 250–380° C. The hardening time is usually at the most 1 hour, a maximum of 45 min and particularly a maximum of 30 min being preferred.

By means of the degree of hydrolysis, the viscosity of the coating solution, particularly of the dipping solution, can be adjusted accurately to a value appropriate for the withdrawal of the object being coated. In this manner, for a known viscosity and for a known withdrawing rate, the film thickness can be produced in exactly reproducible manner. A change in viscosity when using the coating or dipping solution can be adjusted to the desired value in simple manner by dilution with a solvent, for example ethanol, or by adding additional hydrolyzable sol-gel solution.

By the process of the invention, it is also possible to adapt the refractive index of the coating to the support material. This can be accomplished, for example, by mixing different metal oxides. The refractive index of $SiO_2$ is n=1.45 and that of $TiO_2$ is n=2.3. In the $SiO_2/TiO_2$ system, any refractive index within these limits can be obtained, depending on the composition. By adjusting the refractive index and the film thickness, the process of the invention is also particularly suitable for preparing interference layers, for example to reduce reflectivity.

In a particular embodiment of the invention, the durable hydrophobic film is provided, by means of appropriate measures taken before, during or after the heat-hardening, with a surface microstructure, whereby the hydrophobic properties of the film are enhanced and the cleaning of the film is facilitated, or the film is provided with an antireflection effect or this effect is enhanced. Such effects can be achieved by incorporating particles or by embossing. In this manner, it is possible to obtain surface microstructures with, for example, knobs which limit contact between dirt particles and the surface coated according to the invention to only a few contact points as, for example, in the "lotus effect". In this manner, the desired cleaning effect is further enhanced.

In principle, it is possible to coat by the process of the invention any materials capable of withstanding the previously described sintering temperature. These materials include, in particular, metals, plastics, inorganic minerals, rocks, such as marble and granite, and burned clays. It is particularly preferred, however, to coat glass and glass-ceramics by the process of the invention. Preferred glasses for this purpose are borosilicate, soda-lime and optical glasses. The process of the invention is particularly well suited for producing easily cleanable flat glasses and particularly float glasses, curved glasses, optical lenses, glass tubes, TV and PC screens and front glasses therefor, furthermore glass-ceramic products, motor vehicle glass enclosures, enameled and/or ceramic products. Preferred flat glasses are, for example window glasses, mirror glasses, shower enclosure glasses, glass shelves, cover glasses for solar collectors, sight glasses, instrument glasses, glass keyboards, touch screen panels, display cover glasses, for example for mobile telephones and laptops, glasses for furnaces, for example baking oven panels, glass baking trays and/or glass baking containers, lamp cover glasses and glasses for refrigerators and furniture. Curved glasses are, for example, spotlight glasses, lamp cover glasses, watch glasses and/or sanitary glasses. Glass lenses are, for example, spectacle lenses and ocular and objective glasses in optical devices. Glass tubes are, for example, solar collector tubes and wastewater pipes. Vehicle glass enclosures are, for example, windows and instrument covering glasses for automotive vehicles, for vehicles that move on tracks, for example trains etc, for ships and for airplanes. Enameled products are, for example, baking trays and sauce pans, and sanitary objects are wash basins, urinals, bathtubs and toilet bowls. Ceramic products are, for example, floor tiles, roofing tiles and the aforesaid sanitary objects.

The process of the invention is also suited for coating household objects, such as drinking glasses, glass cooking utensils, and cooking areas made of glass-ceramics obtainable, for example, under the CERAN® trademark. The process of the invention is also suitable for coating enameled cooking utensils, for example pots and pans.

By the process of the invention, however, it is also possible to produce multiple optical interference layers, for example reflectivity-reducing layers. Such reflectivity-reducing layers according to the invention are preferably produced as the outermost layer facing the surroundings or air.

The invention will now be illustrated in greater detail by way of the following examples.

EXAMPLE 1

Preparation of a Hydrophobically Modified $SiO_2$ Dipping Solution a) A mixture is prepared (mixture A) consisting of 13.6 g of tetramethylorthosilicate (CAS:681-84-5 supplied under the trademark DYNASIL™ M by Degussa Frankfurt/Germany) and of 13.6 g of ethanol (96%); as well as a mixture (B) consisting of 3.75 g of distilled water and of 0.15 g of HCl (36%). The mixtures A and B are mixed and stirred at room temperature over a period of 10 minutes. Afterwards a mixture consisting of 1.4 g of a water-soluble modified fluoroalkylsiloxane (CAS 64-17-5 supplied under the trademark DYNASYLAN™ F8800 by Degussa Frankfurt/Germany) as well as of 175 g of ethanol (96%) is stirred into mixtures A and B. The resulting mixture is used as dipping solution.

b) Analogous to a), mixture A is prepared consisting of 13.6 g of ethyl polysilicate (obtained from tetraethylsilicate and supplied under the trademark DYNASYL™ 40 by Degussa AG Frankfurt/Germany) as well as of 13.6 g of ethanol (96%) and mixture B is prepared consisting of 3.8 g of water as well as of 0.15 g of hydrochloric acid (36%). Afterwards both mixtures are blended and stirred over a period of 10 minutes. Afterwards a mixture is stirred into the thus obtained blend consisting of 1.4 g of a water-soluble modified fluoroalkylsiloxane that comprises aminoalkyl-functional substituents (CAS No. 64-17-5, supplied by Degussa AG Frankfurt am Main/Germany under the trademark DYNASYLAN™ F8800) as well as of 175 g of ethanol (99.5%).

c) A mixture is prepared consisting of 254.2 g of ethanol (99.5%), 77.6 g of water, 7.2 g of glacial acetic acid and 90.8 g of tetramethylorthosilicate (DYNASYL™ M, see above). This mixture is allowed to stand over a period of 24 hours. Afterwards, 25 g of the thus obtained concentrate is stirred into 75 g of ethanol (99.5%) and then blended with a mixture consisting of 100 g of ethanol (99.5%) and 1.4 g of a fluoroalkyl-functional water-soluble polysiloxane which is turned water soluble by means of a aminoalkyl-functional substitution (CAS No. 64-17-5, DYNASYLAN™ F8800). Thus, the finished dipping solution is obtained.

d) 88.6 mL of methyl silicate, 80 mL of distilled water and 10 mL of glacial acetic acid were stirred into 240 mL of ethanol. The resulting solution was allowed to stand for 72 hours. It was then diluted with 1580 mL of ethanol, and the hydrolysis was stopped with 2 mL of 37% hydrochloric acid solution. Then, 8.6 mL of tridecafluorooctyltriethoxysilane (supplied under the trademark DYNASYLAN™ F 8261 by Degussa-Hüls, Frankfurt, Germany) was added with stirring.

The coating was applied according to the invention in a single dipping step and allowed to dry for 5 min at room temperature. It was then baked at 250° C. for a maximum of 30 min, which caused the silica gel to harden.

EXAMPLE 2

Preparation and Testing of a Coating of the Invention

A clean 2-mm-thick 10×20 cm panel of borosilicate glass was immersed at room temperature in the SiO$_2$ dipping solution described hereinabove in Example 1 and was then withdrawn from the solution at a rate of 20 cm/minute. The coating film thus applied was allowed to dry for 5 min at room temperature and was then baked for 20 min in an oven at 250° C. (Table I, coating 1) or at 300° C. (Table I, coating 2). After the baking, the coating of the invention was about 120 nm thick. The hydrophobic preparation process was evaluated by determining the contact angle with water. This was done with a model G 10 contact angle meter supplied by KROSS, Hamburg, Germany. By this method, freshly cleaned glass surfaces show a contact angle of $\leq 20°$, coated glass surfaces one of about 60° C. and surfaces freshly rendered hydrophobic have a contact angle of $\geq 100°$.

Immediately after the preparation according to the invention, a value of 110° was measured at room temperature in this manner. Thereafter, a Schrubb test was performed as follows. A piece of felt having an contact surface of about 3 cm$^2$ and moistened with water was moved on the test specimen back and forth while subjecting it to a total load of m=1 kg. Here, a rubbing cycle corresponds to one to and fro movement.

After 500 rubbing cycles by the Schrubb test, the contact angle was still 102°, after 1000 cycles it was 103° and after 2000 cycles it was still 100°, within an accuracy of ±3°.

EXAMPLE 3 (COMPARATIVE EXAMPLE)

Hydrophobic Preparation Based on a Fluoroalkylsilane

A glass surface was rendered hydrophobic in accordance with the prior art by applying tridecafluoro-octyltriethoxysilane (F 8262, supplied by DEGUSSA-HÜLS). The fluoroalkylsilane was applied to the entire surface with a textile cloth and fixed for 20 min at 200° or 250° C. Determination of the contact angle with water showed immediately after preparation a value of 108°. After 500 rubbing cycles by the Schrubb test (see above), the contact angle was 81°, after 1000 cycles it was 68° and after 2000 cycles it was still 67°. Similar values were also obtained for identically tested hydrophobic glass surfaces from different manufacturers.

EXAMPLE 4 (COMPARATIVE EXAMPLE)

Hydrophobic Preparation Based on Silicone Oil

By applying hydromethylpolysiloxane (Fluid 1107, supplied by DOW CORNING), a glass surface was rendered hydrophobic in accordance with the prior art. The silicone oil was applied to the entire surface with a textile cloth and fixed at 180° C. for 20 minutes. Determination of the contact angle with water showed immediately after preparation a value of 102°. After 500 rubbing cycles by the Schrubb test (see above), the contact angle was 87°, after 1000 cycles it was 71° and after 2000 cycles it was still 51°. Similar values were also obtained for identically tested hydrophobic glass surfaces from different manufacturers.

EXAMPLE 5 (COMPARATIVE EXAMPLE)

Performance of Commercially Available Hydrophobic Glass Surfaces

Four different commercially available hydrophobic glasses from different manufacturers were subjected to a rubbing or Schrubb test as described in Example 2. The test results are summarized in Table I.

TABLE I

Contact Angle with Water in Degrees on Different Hydrophobic Glass Surfaces After n Rubbing Cycles

| Preparation/Origin | n = 0 | n = 500 | n = 1000 | n = 2000 |
|---|---|---|---|---|
| Coating 1, according to Invention, Example 2 (250° C.) | 114 | 106 | 102 | 101 |
| Coating 2, according to Invention, Example 2 (300° C.) | 110 | 102 | 103 | 100 |
| Example 3 (Comp. Example according to prior art, coated with fluoroalkyl-silane) | 108 | 81 | 68 | 67 |
| Example 4 (Comp. Example according to prior art, coated with silicone oil) | 102 | 87 | 71 | 51 |
| Commercially available hydrophobic glass surfaces as per Example 5 | 90–99 | 54–89 | 50–71 | — |

While the invention has been illustrated and described as embodied in a process for making a product with an easily cleanable surface by coating the surface with a hydrophobic material and to products obtained by this process, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for making a product with a long-lasting, easily-cleaned surface by coating the surface with a hydrophobic and/or dirt-repellent material to form a coating on the surface, said coating having properties that are homogeneous or uniform in cross section through said coating, wherein said process comprises the steps of:
   a) applying a coating mixture to said surface so as to form a gel network having a backbone on said surface, said coating mixture comprising a hydrolyzable, network-forming gel and a hydrophobic and/or dirt-repellent substance; and
   b) chemically binding the hydrophobic and/or dirt-repellent substance in the backbone of the gel network on said surfaces;
   wherein the coating consists of said gel network with said hydrophobic and/or dirt-repellant substance bound in the backbone of the gel network so that said hydrophobic and/or dirt-repellant substance is distributed in a uniform concentration throughout said coating.

2. The process as defined in claim 1, further comprising hardening said gel after said applying.

3. The process as defined in claim 1, wherein said gel network is provided in a hydrogel, an alkogel, a xerogel or an aerogel.

4. The process as defined in claim 1, wherein said gel is formed from $SiO_2$, $Al_2O_3$, $Fe_2O_3$, $SnO_2$, $ZrO_2$, $B_2O_3$ and/or $TiO_2$.

5. The process as defined in claim 1, wherein said hydrophobic and/or dirt-repellent substance is a silane.

6. The process as defined in claim 5, wherein said silane has the formula:

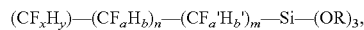

$(CF_xH_y)-(CF_aH_b)_n-(CF_a'H_b')_m-Si-(OR)_3$, wherein x and y, independently of each other, stand for 0,1, 2 or 3 and x+y=3, and a, a' and b, b', independently of each other, stand for 0, 1 or 2, and a+b as well as a'+b'=2, and n and m, independently of each other, denote an integer from 0 to 20 and together add up to a maximum of 30, and R is a straight-chain, branched, saturated or unsaturated, optionally heteroatom-containing, $C_1$–$C_8$-alkyl or aminoalkyl group.

7. The process as defined in claim 1, wherein said coating mixture is an organometallic sol solution that is hydrolyzable to form said gel network after dissolving said hydrophobic and/or dirt-repellent substance in said organometallic sol solution.

8. The process as defined in claim 1, wherein the applying of the coating mixture comprises dipping in the coating mixture, spraying the coating mixture, spinning the coating mixture, rolling the coating mixture on the product, curtain-coating the coating mixture or screen printing the coating mixture on the product.

9. A coated product with a long-lasting easily cleanable coating thereon, said product being made by a process comprising the steps of:
   a) providing a coating mixture comprising a hydrolyzable, network-forming gel and a hydrophobic and/or dirt-repellent substance;
   b) applying the coating mixture to a surface of a product to form a gel network having a backbone on said surface of said product; and
   c) chemically binding the hydrophobic and/or dirt-repellent substance in the backbone of the gel network so as to form the easily cleanable coating on the surface of the product;
   wherein the coating consists of said gel network with said hydrophobic and/or dirt-repellant substance bound in the backbone of the gel network so that said hydrophobic and/or dirt-repellant substance is distributed in a uniform concentration throughout said coating.

10. The coated product as defined in claim 9, wherein said process comprises hardening said gel after said applying.

11. The coated product as defined in claim 9, wherein said gel network is provided in a hydrogel, an alkogel, a xerogel or an aerogel.

12. The coated product as defined in claim 9, wherein said gel is formed from $SiO_2$, $Al_2O_3$, $Fe_2O_3$, $SnO_2$, $ZrO_2$, $B_2O_3$ and/or $TiO_2$.

13. The coated product as defined in claim 9, wherein said coating mixture is an organometallic sol solution that is hydrolyzable to form said gel network after dissolving said hydrophobic and/or dirt-repellent substance in said organometallic sol solution.

14. The coated product as defined in claim 9, wherein said applying of the coating mixture comprises dipping in the coating mixture, spraying the coating mixture, spinning the coating mixture, rolling the coating mixture on the product, curtain-coating the coating mixture or screen printing the coating mixture on the product.

15. The coated product as defined in claim 9, consisting of a window glass, a mirror glass, a shower enclosure glass, a shelf glass, a cover glass for a solar collector, a sight glass, an instrument glass, a glass keyboard, a touch screen panel, a display cover glass, a glass for a furnace, a lamp cover glass, a glass for a refrigerator, a glass for a piece of furniture, a spotlight glass, a watch glass, a sanitary glass, a glass for an eyeglass lens, an ocular glass for an optical device, an objective glass for an optical device, a solar collector tube, a waste-water pipe, a TV screen, a PC monitor glass, a TC front cover glass, a PC front cover glass, an instrument-covering glass for a motor vehicle, train, ship or airplane, a baking tray, a sauce pan, a sanitary object, a floor tile or a roofing tile.

16. The coated product as defined in claim 9, wherein said hydrophobic and/or dirt-repellent substance is a silane.

17. The coated product as defined in claim 16, wherein said silane has the formula:

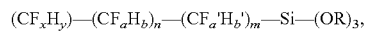

$(CF_xH_y)-(CF_aH_b)_n-(CF_a'H_b')_m-Si-(OR)_3$, wherein x and y, independently of each other, stand for 0,1, 2 or 3 and x+y=3, and a, a' and b, b', independently of each other, stand for 0, 1 or 2, and a+b as well as a'+b'=2, and n and m, independently of each other, denote an integer from 0 to 20 and together add up to a maximum of 30, and R is a straight-chain, branched, saturated or unsaturated, optionally heteroatom-containing, $C_1$–$C_8$-alkyl alkyl or aminoalkyl group.

* * * * *